United States Patent

Engler

[15] 3,657,941

[45] Apr. 25, 1972

[54] COUPLING UNIT

[72] Inventor: William P. Engler, 11520 San Vicente Boulevard, Los Angeles, Calif. 90049

[22] Filed: Sept. 2, 1970

[21] Appl. No.: 69,005

[52] U.S. Cl. .................................74/417, 18/4 P, 18/6 R, 18/20 RR, 64/2 R, 264/310
[51] Int. Cl. ......................F16h 1/14, B29h 5/00, F16c 1/02
[58] Field of Search......................64/2 R, 32 F; 74/416, 417, 74/423; 18/20 RR, 6 R, 41 P; 264/57, 310; 285/235, 238; 287/86

[56] References Cited

UNITED STATES PATENTS

| | | | |
|---|---|---|---|
| 3,347,971 | 10/1967 | Mankowich | 264/310 |
| 1,601,099 | 9/1926 | Arens | 64/2 R |
| 1,138,791 | 5/1915 | Rieder | 18/6 |
| 2,704,005 | 3/1955 | Clayson | 64/2 X |
| 3,307,029 | 2/1967 | Gross | 64/2 R |

Primary Examiner—Leonard H. Gerin
Attorney—Jessup & Beecher

[57] ABSTRACT

A coupling unit is provided for the transmission of electricity, gas, liquids, vacuum pressure, or other media around a rotating bend in complex machinery. The unit has particular utility in conjunction with rotational molding apparatus and shall be described in such an environment. However, it will become evident as the description proceeds that the unit and concept of the invention has general utility whenever it is desired to exert certain control effects on moving components in complex rotating machinery, or to monitor the condition of such components.

3 Claims, 4 Drawing Figures

INVENTOR
William P. Engler

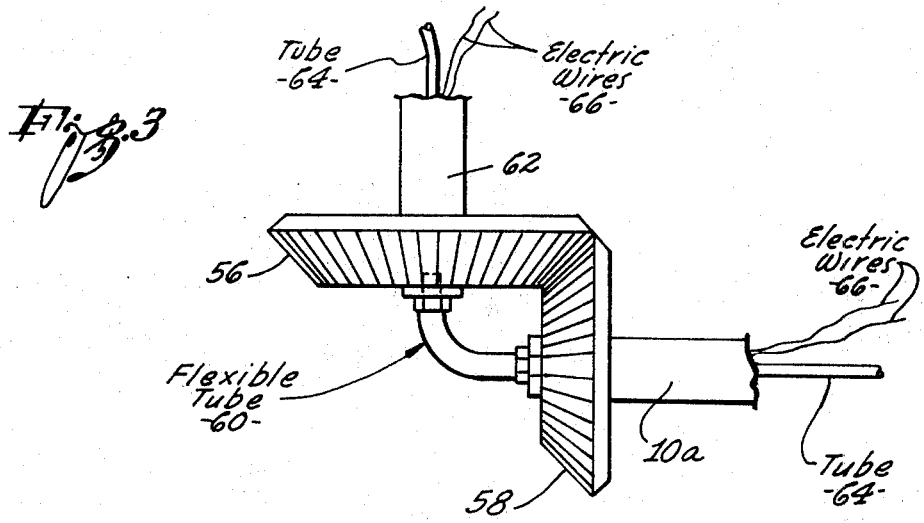
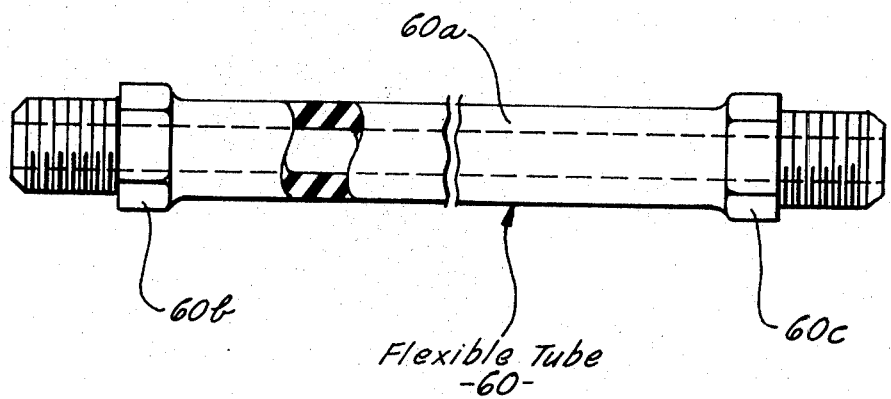

3,657,941

COUPLING UNIT

BACKGROUND OF THE INVENTION

As is well known, rotational molding is a process for the fabrication of parts from thermoplastic material. A multiplicity of split molds are usually used in rotational molding machinery, and the bottom part of each mold is charged with the exact amount of powdered resin required to make the molding. The mold halves of each mold are then clamped together, and the molds are subjected to a heating operation while being rotated simultaneously about two axes at right angles to one another. During the heating interval, which may vary from 3 to 20 minutes, for example, the powdered resin tumbles within the mold and gradually fuses to form a homogeneous layer of uniform thickness on the inner surface of the mold. In this way, a hollow object is formed within each mold cavity. When all the resin powder has fused together, the molds are then transferred to a cooling chamber and continuously rotated. Finally, the molds are moved, without rotation, to an unloading zone where they are opened and the molded objects are removed.

Due to the complexity of rotational movements in the usual rotational molding machine, no effort has been made in the past to provide for any controls insofar as the individual molds are concerned. Specifically, although highly desirable, there is no means in the prior art machines for determining the actual temperatures at the various parts of the individual molds, and the entire molding operation must be carried out on a trial and error timing cycle. Also, there are no means in the prior art rotational molding equipment which would enable the individual molds to be evacuated or pressurized, or which would permit automatic opening or closing of the individual molds.

By means of the coupling unit of the present invention, it is possible to couple electric wires, tubing, and the like, from appropriate external control equipment to the individual rotating molds of the aforesaid molding machine so that appropriate controls of the individual molds may be made; and appropriate measurements of the temperatures, or other parameters, of the individual molds taken.

BRIEF DESCRIPTION OF THE DRAWING

FIG. 3 is a fragmentary representation showing the practice of the invention in which a flexible tube is coupled between two rotating hollow shafts which are positioned at right angles to one another; and FIG. 4 is an enlarged detailed view of the structural aspects of the flexible tube of FIG. 3 in one of its embodiments.

DETAILED DESCRIPTION OF THE ILLUSTRATED EMBODIMENT

Figure 1:
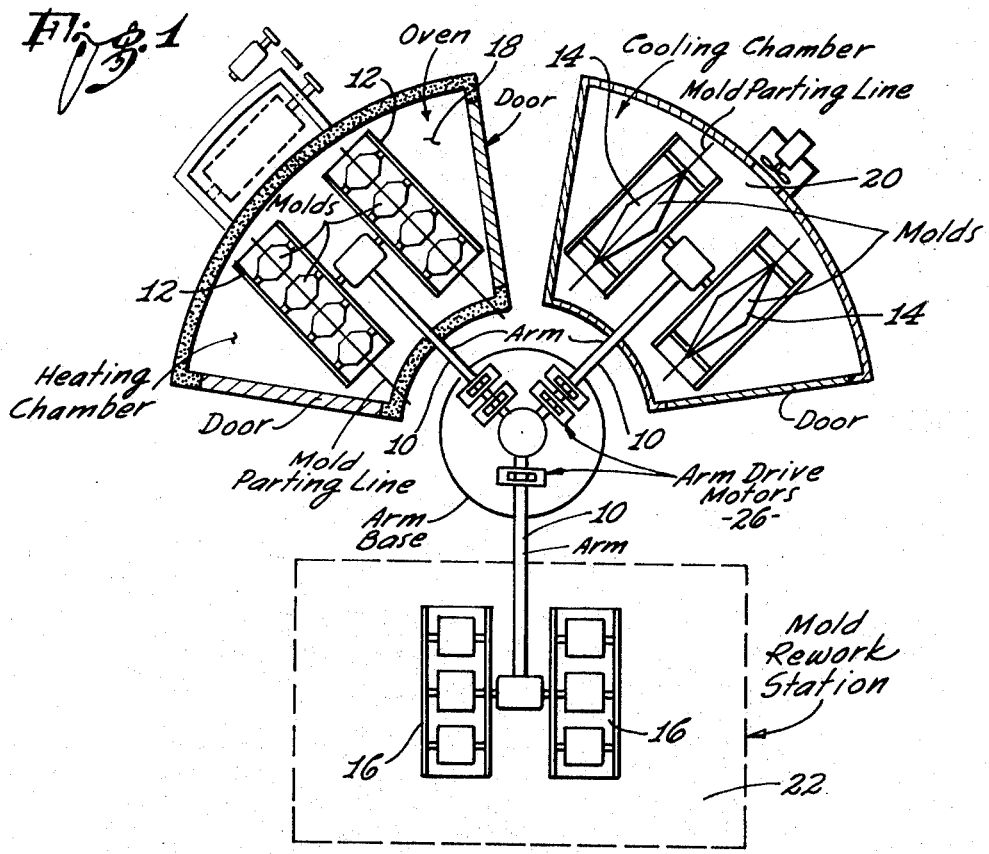
FIG. 1 is a schematic plan view of typical prior art rotational molding equipment.

The commercial rotational molding machine shown schematically in FIG. 1 provides three phases of molding operation which may occur simultaneously with respect to different groups of molds. The illustrated machine, for example, includes three drive arms 10 which are supported for rotation about an axis extending vertically to the plane of the paper, and which are disposed, for example, at 120° to one another.

A first group of molds designated 12 is supported at the end of one of the arms 10, a second group of molds designated 14 is supported at the end of a second arm 10, and a third group of molds 16 is supported at the end of the third arm 10.

As the arms 10 are rotated, the molds 12, 14, and 16 are moved through the various phases of the process. For example, in the illustrated position of the arms 10, the molds 12 are positioned in a heating chamber 18, the molds 14 are positioned in a cooling chamber 20, and the molds 16 are positioned at a mold re-work station 22. In that position of the arms 10, the articles previously molded in the molds 16 may be removed, and new charges of resin powder is inserted into the molds for the next operation. The charges in the molds 12 at this time, are being heated in the oven 18, so that the products are being formed. The products formed in the molds 14 are, at the same time, being cooled in the cooling chamber 20.

It will be appreciated that as the arms 10 are rotated, each group of molds is moved from one station to another. The oven or heating chamber 18, the cooler or cooling chamber 20, and the mold re-work station 22 are spaced equally around a circle in FIG. 1, so that one of the arms 10 is indexed in each position. Usually the arms 10 move simultaneously from station to station. As mentioned above, there are several molds on each of the arms, and these are held together between spiders. Each spider has matching halves of the mold mounted on it for convenience of handling.

The heat is applied to the molds in the oven 18, for example, either by the forced convection of hot air, by a hot liquid spray, or by radiant heat. Cooling is generally accomplished in the cooling chamber 20 by a spray of water on the outside of the molds. As mentioned above, the various molds of the different groups are rotated about two axes. The rotation of the molds around the two axes may be accomplished in various ways. The ratio of the number of major axis revolutions to the number of minor axis revolutions is an important variable, and such rotations are controlled, for example, by independent arm drive motors designated 26 in FIG. 1.

Figure 2:
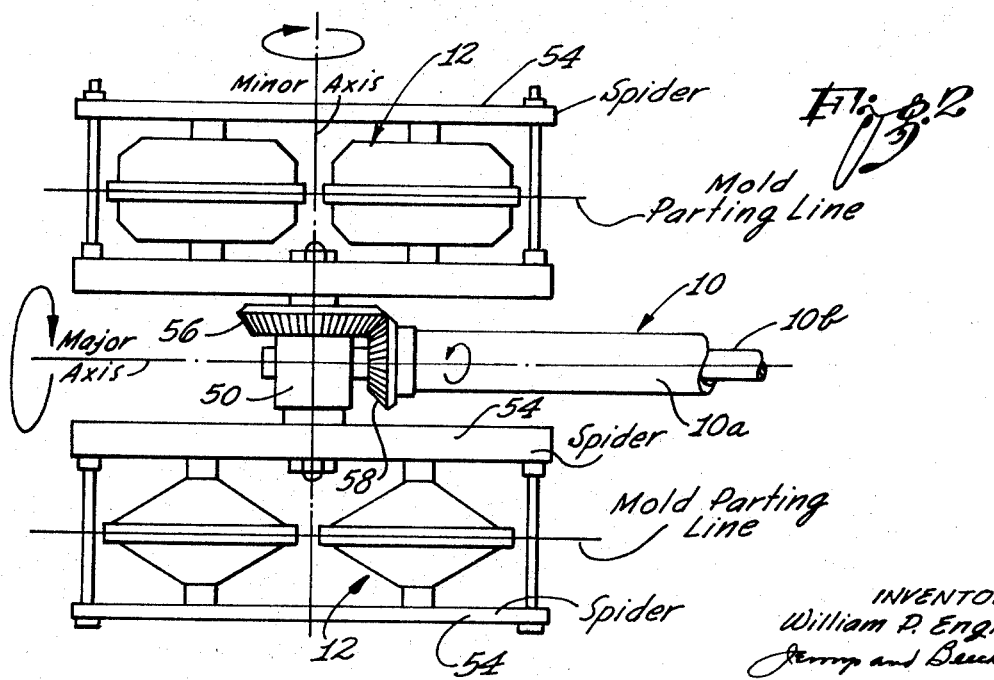
FIG. 2 is a schematic representation of a spur gear drive of the individual molds, so as to provide for a rotation of the molds about a major axis and a minor axis at right angles to one another.

A typical drive between one of the arms 10 and, for example, the molds 12 is shown in FIG. 2. The arms 10 actually includes two concentric tubular members 10a and 10b. The tubular member 10b is driven by one of the arm drive motors, and the tubular member 10a is driven by a second arm drive motor, these motors being individually controllable, so that the speeds of rotation of the two tubular members 10a and 10b may be controlled. The tubular shaft 10b is affixed to a hub 50, so that rotation of the shaft 10b causes the hub 50 to rotate about the major axis, as indicated by the arrow to the left of FIG. 2. This causes the spiders 54 and the supported molds 12 to rotate about the major axis. At the same time, rotation of the tubular shaft 10a causes the individual spiders 54 and supported molds 12 to rotate about a minor axis, as indicated by the arrows to the top of FIG. 2, and which is disposed at 90° to the major axis. This latter rotation is effectuated by means of a pair of spur gears 56 and 58, as shown.

In the practice of the present invention, it is desired to intercouple electric wires, tubes, and the like to the individual molds 12 within the spiders 54. Heretofore, it was considered unfeasible to provide such a coupling, due to the complexity of the movement of the molds and spiders about the two axes. However, in the practice of the present invention, this coupling is achieved by providing a hollow flexible tube 60, as shown in FIG. 3 which intercouples the end of the hollow tubular shaft 10a to a further hollow tubular shaft 62, the latter shaft supporting the spur gear 56 and being secured to the rotating spiders 54.

The flexible tube 60 is shown in more detail, for example, in FIG. 4. The tube itself may be composed of silicone or other appropriate flexible material which, for example, in the particular application under consideration must be able to withstand the temperatures encountered in the oven 18. Silicone is appropriate for this purpose since it will withstand temperatures up to 1,400° F.

The tubular member 60 of FIG. 4 includes in the particular illustrated embodiment a central position 60a, and a pair of end portions forming fittings 60b and 60c. The fittings 60b and 60c may be threaded, to serve as appropriate attachments for the tubular member into the ends of the hollow shafts 10a and 10b. The shafts may be provided with female threads, and as shown in FIG. 4, the fittings may have male threads, preferably extending in the opposite direction, so that as the tubular member 60 is turned to tighten the threads, both ends will tighten at the same time.

The tubular member 60 may, for example, be composed of a single tube, or it may be composed of a single tube, or it may be composed of a multiplicity of concentric tubes, each serving to conduct a different gas or liquid around the rotating bend, and from an appropriate external source to the individual molds. One such tube is designated, for example, 64 in FIG. 3. Likewise, electric wires may be strung through the tubular member, as designated 66 in FIG. 3. It is evident that by means of the tubes and wires, any desired control may be effectuated at the individual molds, while the machine is actually operating. It is also evident that the tube 60 may extend any desired distance through the tubular shaft 62 or through the hollow shaft 10a, or both.

Basically, the coupling unit of the invention is essentially provided for the transmission of air, fluid, gas, vacuum, electricity, or any combination thereof through a rotating bend. The unit comprises a flexible hollow tube 60, or multiplicity of concentric tubes, as mentioned above, which are bent and rotated about their curved center line. The tube or tubes continually flex while rotating, and there is no need for swivel end connectors.

The fittings 60b and 60c may be integral with the tubular portion 60a, or may be separate therefrom. However, in any event, the fittings 60b and 60c rotate with the tubular portion 60a as an integral unit. As mentioned, the end fittings 60b and 60c are either separate from the tubing 60a and molded or otherwise attached thereto, or they may be an integral part of the material of the tubular portion. In the latter event, the tubular portion may be of a variable hardness throughout its length in order to provide a harder end section to accomplish essentially a tightening effect and a softer basic center section to accomplish the flexibility desired in the operation of the device. The end fittings may be hexagon, square, or other suitable shape which will permit a wrench, or similar device to be used to tighten the tubular member in place.

The invention provides, therefore, an improved coupling whereby electrical wires, tubes, or the like, may be intercoupled from an external source to rotating components in a relatively complex machine, so that the state of the rotating components may be monitored, and so that appropriate controls may be provided for the components.

It is apparent that although a particular embodiment of the invention has been shown and described, modifications may be made, and it is intended in the following claims to cover all modifications which fall within the spirit and scope of the invention.

What is claimed is:

1. In combination: a first shaft mounted for rotation about a particular first axis; a second shaft mounted for rotation about a particular second axis traversing said first axis; a hollow flexible tubular member affixed to said first and second shafts and intercoupling the ends of said first and second shafts and rotatable therewith, and a plurality of electric wires extending through said hollow flexible tubular member.

2. In combination: a first shaft mounted for rotation about a particular first axis; a second shaft mounted for rotation about a particular second axis traversing said first axis; a hollow flexible tubular member affixed to said first and second shafts and intercoupling the ends of said first and second shafts and rotatable therewith, and at least one separate tubular member extending through said hollow flexible tubular member.

3. In combination: a first shaft mounted for rotation about a particular first axis; a second shaft mounted for rotation about a particular second axis traversing said first axis; and a hollow flexible tubular member affixed to said first and second shafts and intercoupling the ends of said first and second shafts and rotatable therewith, said hollow flexible tubular member having integral end fittings configured to intercouple said flexible tubular member; with the respective ends of said first and second shafts, said hollow flexible tubular member and said end fittings being composed of a material exhibiting variable hardness throughout its length so that said fittings are of a harder consistency than the central portion of said flexible tubular member.

* * * * *